(12) United States Patent
Chang et al.

(10) Patent No.: US 9,390,304 B2
(45) Date of Patent: Jul. 12, 2016

(54) ENCODED INFORMATION READING TERMINAL WITH MICRO-PROJECTOR

(75) Inventors: Chen Chang, Jiangsu (CN); Dayaker Mupkala, Andrapradesh (IN); Xia Tian, JiangSu (CN)

(73) Assignee: Honeywell International, Fort Mill, SC (US)

( * ) Notice: Subject to any disclaimer, the term of this patent is extended or adjusted under 35 U.S.C. 154(b) by 0 days.

(21) Appl. No.: 14/408,315

(22) PCT Filed: Jun. 27, 2012

(86) PCT No.: PCT/CN2012/077592
§ 371 (c)(1),
(2), (4) Date: Dec. 16, 2014

(87) PCT Pub. No.: WO2014/000170
PCT Pub. Date: Jan. 3, 2014

(65) Prior Publication Data
US 2015/0169925 A1    Jun. 18, 2015

(51) Int. Cl.
*G06K 7/14* (2006.01)
*G06K 7/10* (2006.01)
*G02B 26/10* (2006.01)
*G02B 27/02* (2006.01)
*G06K 7/00* (2006.01)

(52) U.S. Cl.
CPC .......... *G06K 7/10732* (2013.01); *G02B 26/108* (2013.01); *G02B 27/021* (2013.01); *G06K 7/0004* (2013.01); *G06K 7/10821* (2013.01)

(58) Field of Classification Search
USPC ................................ 235/462.01–462.49, 454
See application file for complete search history.

(56) References Cited

U.S. PATENT DOCUMENTS

| 5,155,343 | A | * | 10/1992 | Chandler | ........... | G06K 7/10871 235/454 |
| 5,504,319 | A | * | 4/1996 | Li | ......................... | G06K 7/1456 235/462.08 |
| 2002/0084330 | A1 | * | 7/2002 | Chiu | ....................... | G06K 7/10 235/462.11 |

* cited by examiner

*Primary Examiner* — Jamara Franklin
(74) *Attorney, Agent, or Firm* — Additon, Higgins & Pendleton, P.A.

(57) ABSTRACT

An encoded information reading (EIR) terminal can include a microprocessor, a memory, an EIR device including a two-dimensional imager, and a micro-projector including a light source and a light manipulation sub-system. The EIR device can be configured to output raw message data containing an encoded message and/or output a decoded message corresponding to an encoded message. The EIR terminal can be configured to acquire an image of a target object in a field of view (FOV) of the two-dimensional imager. The EIR terminal can be further configured, responsive to successfully locating decodable indicia within the image, to produce a decoded message by decoding the decodable indicia. The EIR terminal can be further configured, responsive to successfully decoding the decodable indicia, to generate a projectable image and to project the projectable image onto a surface the target object using the micro-projector.

20 Claims, 7 Drawing Sheets

ENCODED INFORMATION READING TERMINAL WITH MICRO-PROJECTOR

FIELD OF THE INVENTION

The invention is generally related to encoded information reading (EIR) terminals, and more specifically to EIR terminals performing image processing.

BACKGROUND OF THE INVENTION

Indicia reading apparata for reading decodable indicia are available in multiple varieties. For example, minimally featured indicia reading terminals devoid of a keyboard and display are common in point of sale (POS) applications. Indicia reading terminals devoid of a keyboard and display are available in the recognizable gun style form factor having a handle and a trigger. Indicia reading terminals having keyboards and displays are also available, often in a form where a keyboard and display are combined in a touch screen. Fixed mount indicia reading terminals are also commonly available, e.g., installed under or near a countertop at a point of sale. Indicia reading terminals are commonly used in a variety of data collection applications including POS applications, retail inventory applications, shipping applications, warehousing applications, security check point applications, patient care applications, and personal use applications where the indicia reading apparatus is provided by a mobile telephone having indicia reading functionality.

SUMMARY OF THE INVENTION

In one embodiment, there is provided an encoded information reading (EIR) terminal comprising a microprocessor, a memory, an EIR device including a two-dimensional imager, and a micro-projector including a light source and a light manipulation sub-system. The EIR device can be configured to output raw message data containing an encoded message and/or output a decoded message corresponding to an encoded message. The EIR terminal can be configured to acquire an image of a target object in a field of view (FOV) of the two-dimensional imager. The EIR terminal can be further configured, responsive to successfully locating decodable indicia within the image, to produce a decoded message by decoding the decodable indicia. The EIR terminal can be further configured, responsive to successfully decoding the decodable indicia, to repeatedly perform the following steps: (i) generating a projectable image; (ii) projecting the projectable image onto a surface of the target object using the micro-projector, so that the projectable image provides a visual reference to the decodable indicia on the surface of the target object; (iii) acquiring an image of an object in the FOV; (iv) locating the decodable indicia within the acquired image; and (v) looping back to step (i) unless a pre-defined condition of termination is satisfied.

In a further aspect, the frequency of performing the steps (i)-(v) can be calculated to compensate for movements of the EIR terminal.

In a further aspect, the pre-defined condition of termination can be provided by a pre-defined timeout expiration or a user interface action.

In a further aspect, the EIR terminal can be configured to acquire the image of the target object responsive to a user interface action.

In a further aspect, the visual reference can be provided by overlaying each of the projectable images over the decodable indicia on the surface of the target object or disposing each of the projectable images on the surface of the target object within a distance from the decodable indicia not exceeding a characteristic dimension of the decodable indicia.

In a further aspect, each of the projectable images can include a text string comprising at least a part of the decoded message and/or a text string derived from the decoded message.

In a further aspect, the EIR terminal can further comprise a second EIR device provided by a radio-frequency identifier (RFID) reading device or a card reading device.

In another embodiment, there is provided an EIR terminal comprising a microprocessor, a memory, an EIR device including a two-dimensional imager, a micro-projector including a light source and a light manipulation sub-system, and a motion sensing device configured to output motion sensing data. The EIR device can be configured to output raw message data containing an encoded message and/or output a decoded message corresponding to an encoded message. The EIR terminal can be configured to acquire an image of a target object in a field of view (FOV) of the two-dimensional imager. The EIR terminal can be further configured, responsive to successfully locating decodable indicia within the image, to produce a decoded message by decoding the decodable indicia. The EIR terminal can be further configured, responsive to successfully decoding the decodable indicia, to generate a projectable image and project the projectable image onto a surface of the target object using the micro-projector, the projectable image providing a visual reference to the decodable indicia on the surface the target object. The EIR terminal can be further configured, using the motion sensing data, to compensate for terminal movements when projecting the projectable image.

In a further aspect, the motion sensing device can be provided by at least three accelerometers configured to measure proper acceleration values of the EIR terminal in at least three mutually-perpendicular directions.

In a further aspect, the EIR terminal can be configured to acquire the image of the target object responsive to a user interface action.

In a further aspect, the visual reference can be provided by overlaying the projectable image over the decodable indicia on the surface of the target object and/or disposing the projectable image on the surface of the target object within a distance from the decodable indicia not exceeding a characteristic dimension of the decodable indicia.

In a further aspect, the projectable image can include a text string comprising at least a part of the decoded message and/or a text string derived from the decoded message.

In a further aspect, the EIR terminal can further comprise a second EIR device provided by a radio-frequency identifier (RFID) reading device or a card reading device.

In a yet another embodiment, there is provided an EIR terminal comprising a microprocessor, a memory, an EIR device including a two-dimensional imager, a micro-projector including a light source and a light manipulation sub-system, and a motion sensing device configured to output motion sensing data. The EIR device can be configured to output raw message data containing an encoded message and/or output a decoded message corresponding to an encoded message. The EIR terminal can be configured to acquire an image of a target object in a field of view (FOV) of the two-dimensional imager. The EIR terminal can be further configured, responsive to successfully locating decodable indicia within the image, to produce a decoded message by decoding the decodable indicia. The EIR terminal can be further configured, responsive to successfully decoding the decodable indicia, to generate a projectable image and to project the projectable image onto a surface the target object using the micro-projector. The projectable image can include a text string comprising at least part of the decoded message and/or a text string derived from the decoded message. The EIR terminal can be further configured, using the motion sensing data, to compensate for terminal movements when projecting the projectable image.

In a further aspect, the motion sensing device can be provided by at least three accelerometers configured to measure proper acceleration values of the EIR terminal in at least three mutually-perpendicular directions.

In a further aspect, the EIR terminal can be further configured to acquire the image of the target object responsive to receiving a user interface action.

In a further aspect, the projectable image can provide a visual reference to the decodable indicia on the surface of the target object. In a further aspect, the visual reference can be provided by overlaying the projectable image over the decodable indicia and/or disposing the projectable image within a distance from the decodable indicia not exceeding a characteristic dimension of the decodable indicia.

In a further aspect, the micro-projector can be configured to project onto the surface of the target object a border of the FOV of the two-dimensional imager.

In a further aspect, the EIR terminal can further comprise a second EIR device provided by a radio-frequency identifier (RFID) reading device or a card reading device.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
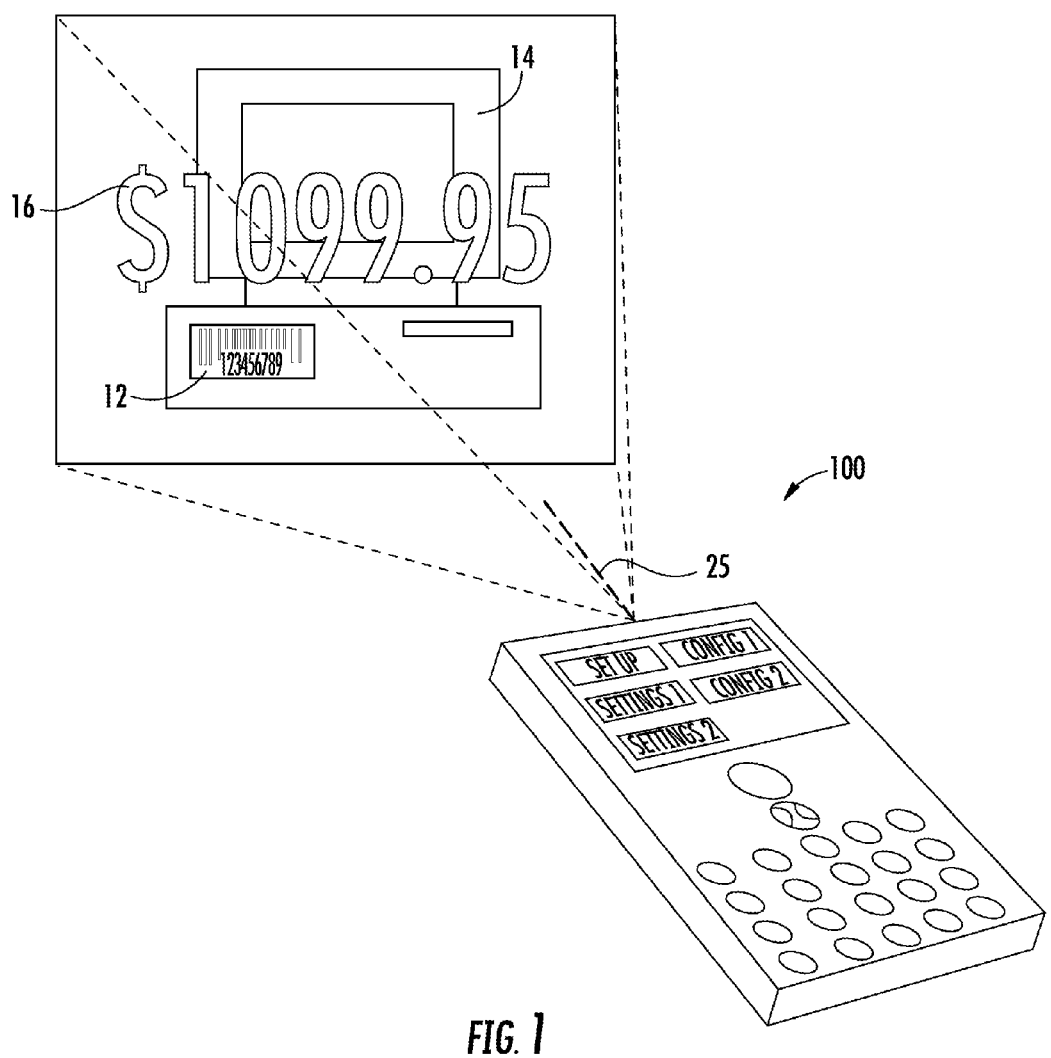
FIG. 1 schematically illustrates an EIR terminal projecting an image onto the surface of an object bearing decodable indicia.

In one embodiment, there is provided an encoded information reading (EIR) terminal comprising an imaging device. The EIR terminal can be configured to acquire an image of an object focused onto by the imaging lens, locate decodable indicia within the acquired image, and decode the decodable indicia into at least one character string comprising alphanumeric and non-alphanumeric characters. For example, a UPC bar code can be decoded into a character string comprising twelve decimal digits identifying the source and the model of a retail item.

The EIR terminal can further comprise a micro-projector including a light source and a light manipulation sub-system. The EIR terminal can be configured, responsive to successfully decoding the decodable indicia, to generate and project an image onto the target object (e.g., the object bearing decodable indicia) using the micro-projector, so that the image would provide a visual reference to the decodable indicia on the surface of the target object. In one illustrative embodiment, schematically shown in FIG. 1, a decoded bar code 12 can be highlighted in order to provide a visual feed back to the operator of the EIR terminal. In another example, the decoded message can be projected with a visual reference to the decoded indicia. In a yet another example, information 16 derived from the decoded message (e.g., price and/or stock information for the item bearing the decodable indicia) can be projected onto the surface of target object 14 with a visual reference to the decoded indicia 12.

In a further aspect, the information derived from the decoded message can be received by the EIR terminal from an external computer. Alternatively, the information derived from the decoded message can be retrieved by the EIR terminal from its memory.

In some embodiments, terminal status information (e.g., battery status, imager parameters, etc.) can be projected onto the surface of the target object. In some embodiments, the border of the field of view (FOV) of the imaging device can be projected onto the surface of the target object.

In a further aspect, the EIR terminal can be configured to compensate for its movements while projecting the image onto the surface of the target object. In one embodiment, the EIR terminal can, responsive to successfully decoding the decodable indicia, to repeatedly generate a projectable image, project the projectable image onto the surface of the target object, and acquire a new image of the target object. Upon projecting the projectable image, the EIR terminal can ascertain whether a pre-determined termination condition is satisfied, and if so, exit from the image projecting loop. The termination condition can be provided, for example, by an expiration of a pre-defined timeout and/or a user interface action.

Alternatively, the EIR terminal can be configured to compensate for the EIR terminal movements when projecting the image onto the surface of the target object by determining the spatial position of the EIR terminal relatively to the object being imaged by the imaging device, and adjusting the position of the projectable image accordingly to the detected shift in the EIR terminal's spatial position, so that the projection of the image remains stationary despite possible movements of the terminal (e.g., due to hand movements of the terminal operator), as long as the decoded indicia remains within the FOV of the imaging device.

The EIR terminal disclosed herein can be used, for example, for bar code reading and decoding POS and other applications. A skilled artisan would appreciate the fact that other uses of EIR terminal are within the scope of this disclosure. Of course, devices that read bar codes, read radio-frequency identifier (RFID) tags, or read cards bearing encoded information (e.g., magnetic cards or smart cards) can read more than one of these categories while remaining within the scope of this disclosure. For example, a device that reads bar codes can include a card reader, and/or RFID reader; a device that reads RFID can also be able to read bar codes and/or cards; and a device that reads cards can be able to also read bar codes and/or RFID. For further clarity, it is not necessary that a device's primary function involve any of these functions in order to be considered such a device; for example, a cellular telephone, a smartphone, or a PDA that is capable of reading bar codes is a device that read bar codes for purposes of this disclosure.

Figure 2:
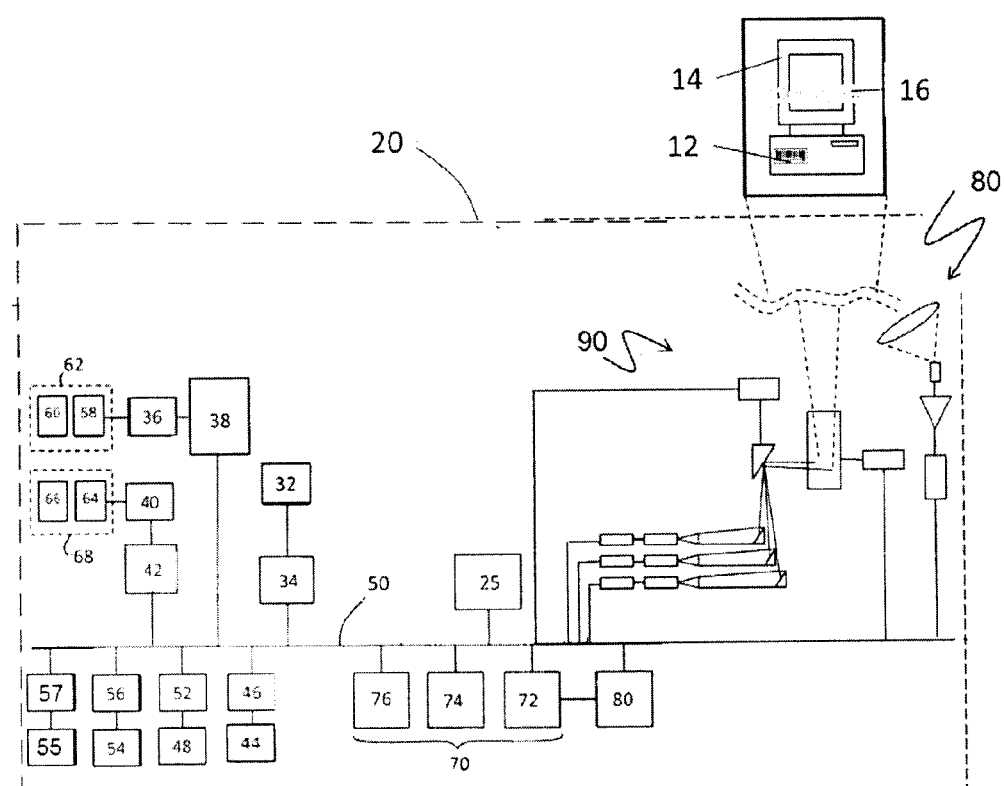
FIG. 2 depicts a block diagram of the EIR terminal disclosed herein.

FIG. 2 illustrates a block diagram of one embodiment of the EIR terminal. EIR terminal 100 can include a microprocessor 25 communicatively coupled to a system bus 50. Also coupled to the system bus 50 can be various components, peripheral devices, and interface circuits. For example, an electrical power input unit 32 can be coupled to system bus 50 by interface circuit 34; an illumination light source bank control circuit 36 can be coupled to system bus 50 by interface circuit 38; an aiming light source bank control circuit 40 can be coupled to system bus 50 by interface circuit 42; and a trigger 44 can be coupled to system bus 50 by interface circuit 46. Terminal 100 can also include a display 48 coupled to system bus 50 via interface 52, and can also include a pointer mechanism 54 coupled to system bus 50 via interface 56.

In one embodiment, EIR terminal 100 can also include a motion sensing device 55 coupled to system bus 50 via interface 57. In a further aspect, motion sensing device 55 can comprise at least three accelerometers configured to measure proper acceleration values of the terminal in at least three mutually-perpendicular directions. A skilled artisan would appreciate the fact that other motion sensing devices are within the scope of this disclosure.

Figure 3:
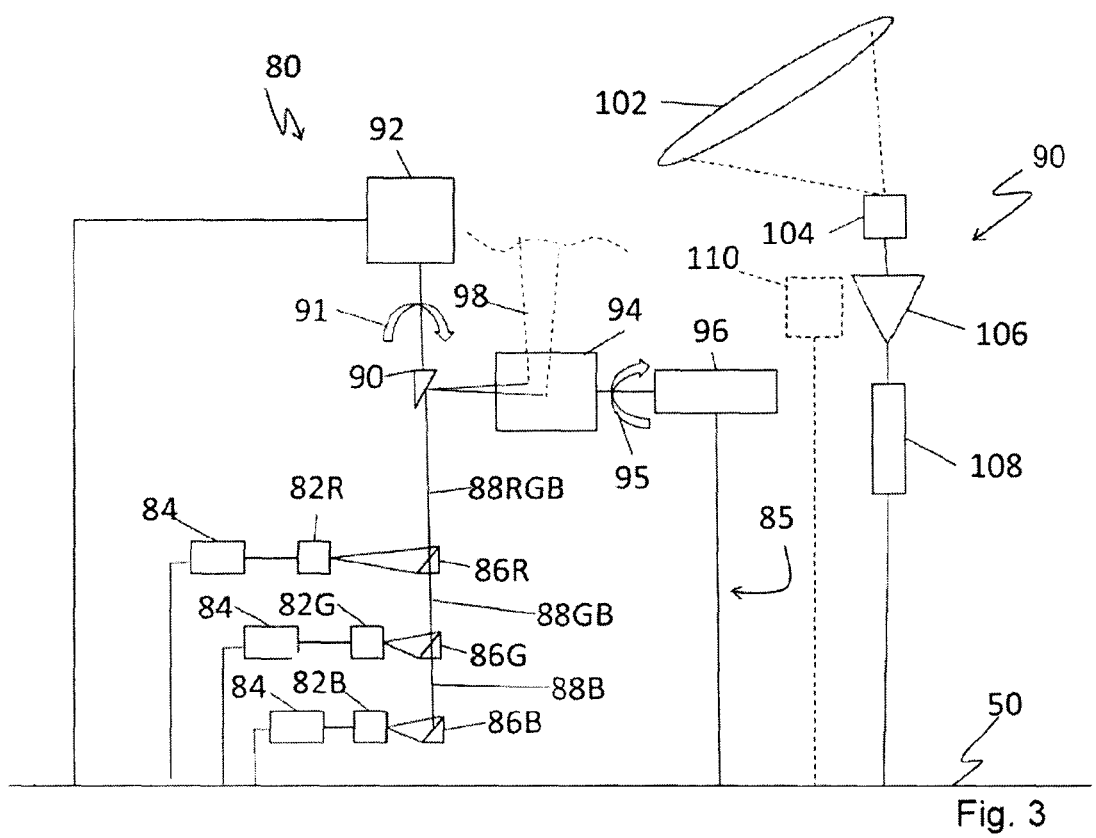
FIG. 3 depicts a block diagram of the indicia reading system and image projecting system comprised by the EIR terminal disclosed herein.

In a further aspect, EIR terminal 100 can comprise an EIR device provided, for example, by an indicia reading system 90 details of which are shown in FIG. 3. Terminal 100 can be configured so that in response to activation of a trigger signal activated by the trigger 44, a succession of frames can be read out from image sensor 104 (see FIG. 3), typically in the form of analog signals, and then, after analog to digital conversion, the image can be stored into memory 70, with optional buffering of one or more of the succession of frames. The EIR device can be configured to output raw message data containing an encoded message and/or output decoded message corresponding to the encoded message.

In one embodiment, EIR terminal 100 can also include an illumination pattern light source bank 58 and associated light shaping optics 60 for generating an illumination pattern on object 14 substantially corresponding to a field of view of terminal 100. The combination of bank 58 and optics 60 can comprise an illumination pattern generator 62. In one embodiment, EIR terminal 100 can also include an aiming pattern light source bank 64 and associated light shaping optics 66 for generating an aiming pattern on the object 14. The combination of bank 64 and optics 66 can comprise an aiming pattern generator 68.

In a further aspect, system memory 70 of terminal 100 can include RAM 72; a nonvolatile memory 74, such as an EPROM; and a storage memory device 76, such as a flash memory or a hard drive memory. Terminal 100 can also include a direct memory access unit (DMA) 80 for providing a direct access to memory 70 to various devices in communication with system bus 50. Alternatively, EIR terminal 100 can employ a system bus 50 providing for bus arbitration mechanism (for example, a PCI bus), thus eliminating the need for a central DMA controller. A skilled artisan would appreciate that other embodiments of the system bus architecture and/or direct memory access components providing for efficient data transfer between the image sensor 104 of FIG. 3 and memory 70 are within the scope and the spirit of the present invention.

In a further aspect, EIR terminal 100 can comprise an image projecting system 80 details of which are shown in FIG. 3.

In one embodiment, EIR terminal 100 can also comprise a second EIR provided, for example, by a radio-frequency identifier (RFID) reading device or a card reading device (e.g., a magnetic card reading device, or a smart card reading device using NFC technology).

FIG. 3 is a detailed view of illustrative embodiments of indicia reading system 90 and image projection system 80 of FIG. 2. In one embodiment, indicia reading system 90 can include image collecting optics 102 configured to receive the light reflected by a target object, and direct the light rays to an image sensor 104. In another aspect of the invention, image sensor 104 can comprise a sensor array, for example, a CCD or CMOS imager or another one- and/or two-dimensional sensor array, such as the sensor arrays disclosed in U.S. patent application Ser. No. 11/174,447 filed on Jun. 30, 2005 [herein "the '447 application"], now U.S. Pat. No. 7,780,089 (other patents pending), marketed under the term "MonoColor" imaging. The disclosure of the '447 application is included by reference herein in its entirety.

Optics 102 can be configured to focus an image of decodable indicia 12 of FIG. 1 located within its field of view, onto image sensor 104. In a further aspect, optics 102 can be capable of providing multiple focal lengths and multiple best focus distances.

Indicia reading system 90 can capture frames of image data at a rate known as a frame rate. A typical frame rate is 60 frames per second (FPS) which translates to a frame time (frame period) of 16.6 milliseconds (ms). Another typical frame rate is 30 frames per second (FPS) which translates to a frame time (frame period) of 33.3 ms per frame.

As shown in FIG. 3, in one aspect, indicia detecting system 90 can include a light source 110. Light source 110 can be provided to illuminate the target object within the field of view of indicia detecting system 90, for example, a bar code label attached to a retail item, as shown in FIG. 1. In one embodiment, light source 110 can be provided by a laser diode. Alternatively, light source 110 can be omitted and the decodable image can be illuminated by projecting system 80, for example, by one or more light sources 82R, 82G, and 82B (one or more red, green or blue laser diodes, respectively). Thus, in one embodiment, projecting system 80 can function as both an image projector and an image illuminator, for example, for indicia reading system 90. In another embodiment, light source 110 can be provided by an illumination system comprising one or more LEDs, including red, green, blue and/or white. In some embodiments, light source 110 can include illumination focusing optical elements comprising one or more lenses or reflective elements.

In a further aspect, the image data captured by image sensor 104 can be processed by amplifier 106 and analog-to-digital (A/D) converter 108 prior to being forwarded to system bus 50, for example, for storage in memory 70 and/or processing by microprocessor 25.

Terminal 100 can be configured to locate one or more decodable indicia within the captured image. Terminal 100 can be further configured, responsive to locating one or more decodable indicia, to decode the decodable indicia. For example, to decode a bar code symbol, EIR terminal 100 can process image data corresponding to a sub-set of image pixels (for example a row, a column, or a diagonal set of pixel positions) to determine a spatial pattern of dark and light cells and can convert each light and dark cell pattern determined into a character or character string via, for example, a table lookup, for output of decode data (decoded image data), e.g., in the form of a character string. A skilled artisan would appreciate the fact that various methods of locating and decoding decodable indicia are within the scope of this disclosure.

Image projecting system 80 is now being described with references to FIG. 3. Image projecting system 80 can include one or more light sources 82 (for example, one or more red 82R, green 82G, and blue 82B, light-emitting diodes (LEDs)) and a light manipulation sub-system 85. Light sources 82 can each be operatively connected to a respective driver 84 coupled to system bus 50. The light emitted by one or more light sources 82 can be directed by light manipulation sub-system 85 configured to project a two dimensional image. In a further aspect, the light manipulation sub-system can comprise one or more prisms 86, and one or more rotatable prisms 90. In one embodiment, prisms 86 can be wavelength selective, by reflecting light substantially only within a specific wavelength range (for example, red light, green light, or blue light) while transmitting other wavelength ranges.

In the illustrative embodiment of FIG. 3, the light emitted by light sources 82 can be directed to one or more rotatable prisms 90 and 94, for example, via one or more prisms 86 (for example, one of prisms 86R reflecting red light, 86G reflecting green light, and 86B reflecting blue light from red laser diode 82R, green laser diode 86G, and blue laser diode 86B, respectively). The light emitted by light sources 82 can be reflected off prisms 86 to a rotating prism 90 as indicated by light beams 88. Mirror or prism 86B can be wave length selective for blue light whereby light received from source 82B can be reflected as blue light beam 88B toward prism 86G. Mirror or prism 86G can be wavelength selective whereby only green light from light source 82G can be reflected off prism 86G while blue light beam 88B can pass substantially unreflected through prism 86G and can combine with the green light from light source 82G reflected off prism 86G to produce a dual color, blue and green (shown as light beam 88GB). In a similar manner, prism 86R can be wavelength selective whereby only red light from light source 82R can be reflected off prism 86R, while green and blue light beam 88GB can pass substantially unreflected through prism 86R and can combine with the red light from light source 82R reflected off prism 86R to produce a multi-color (red, green, and blue) light beam 88RGB. Multi-color light beam 88RGB can be directed to one or more rotatable prisms 90 and 94 to create a two dimensional scan pattern or image with, e.g., two degrees of freedom.

One or more rotatable mirrors 90, having a rotation as indicated by curved arrow 91, can typically be driven by a driver 92 connected to system bus 50. The light reflected from rotatable mirror 90 can be directed to one or more rotatable mirrors 94. Rotatable mirror 94, having a rotation as indicated by curved arrow 95, can also typically be driven by driver 96 connected to system bus 50. The light 98 directed by mirror 94 exits terminal 100, for example, after manipulation by appropriate optics (not shown) and provides the image 16 on object 12 (see FIG. 1). In a further aspect, light sources 82 can also include appropriate beam forming optical elements such as collimating lenses, apertures, and/or phase masks associated with them.

Figure 4:
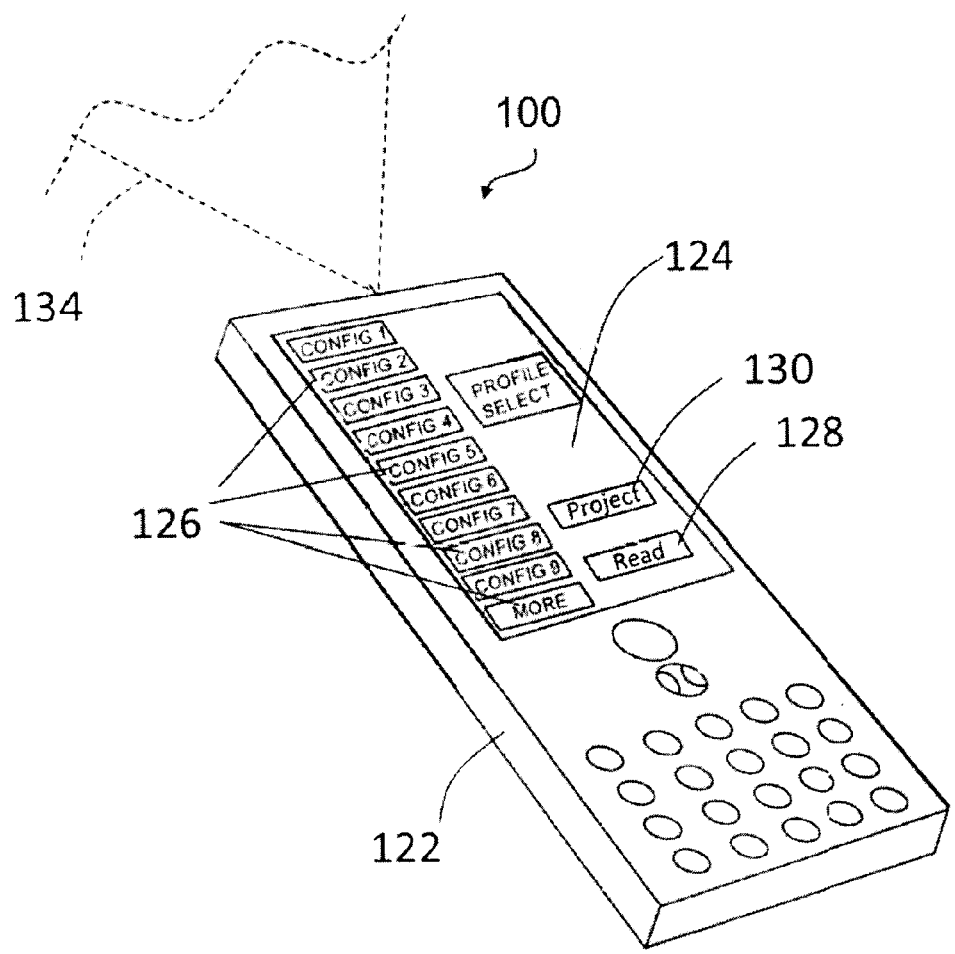
FIG. 4 depicts a perspective view of the EIR terminal disclosed herein.

FIG. 4 is a perspective view of one embodiment of a decodable indicia reading terminal 100 disclosed herein. Terminal 100 can include a housing 122 having a display 124, for example, an LCD or LED display. Display 124 can be employed to display a graphical user interface (GUI) having a plurality of icons 126 for user input, manipulation, or activation of pre-determined routines. Terminal 100 can include at least one icon or button 128 adapted to activate an indicia reading system, for example, indicia reading system 90 shown in FIG. 3. Terminal 100 can also include an icon or button 130 adapted to activate projecting system 80 shown in FIG. 3. In one embodiment, selection of "Read" icon 128 can activate indicia reading system 90 whereby terminal 100 can acquire an image of a target object within its field of view, and can locate and decode one or more decodable indicia.

In one embodiment, upon decoding one or more decodable indicia 12, without additional input from the user, EIR terminal 100 can generate and project onto the surface of target object 16 an image comprising at least one text string containing at least part of the decoded message or derived from the decoded message (e.g., price and/or stock information for the item bearing the decodable indicia). Alternatively, EIR terminal 100 can generate and project onto the surface of target object 16 an image comprising at least one text string containing at least part of the decoded message or derived from the decoded message responsive to receiving a user input (e.g., the user's selecting "Project" icon 130).

In a further aspect, image detection and image projection can be provided from any surface of housing 122, for example, from a top surface, that is, the surface having display 124; or a bottom surface, that is, the surface opposite the surface having display 124, or from any one or more of the lateral or side surfaces of housing 122. In one embodiment, image data can be received and projection data can be projected from the same surface of housing 122, for example, as shown in FIG. 4 where the image is received and the image is projected from a top edge of housing 122. In another embodiment, image detection and image projection can be provided from different surfaces of housing 122. For example, image detection can be provided from the top edge of housing 122, as shown in FIG. 4, while image projection can be provided from the bottom surface of housing 122, that is, from the surface opposite display 124. Other configurations and relative physical locations for image detection and image projection are within the scope of this disclosure.

As noted herein supra, in one embodiment, the EIR terminal can be configured to compensate for its movements while projecting the image onto the surface of the target object. In one embodiment, the EIR terminal can, responsive to successfully decoding the decodable indicia, to repeatedly generate a projectable image, project the projectable image onto the surface of the target object, and acquire a new image if the the target object. Upon projecting the projectable image, the EIR terminal can ascertain whether a pre-determined termination condition is satisfied, and if so, exit from the image projecting loop. The termination condition can be provided, for example, by an expiration of a pre-defined timeout and/or a user interface action.

Figure 5A:
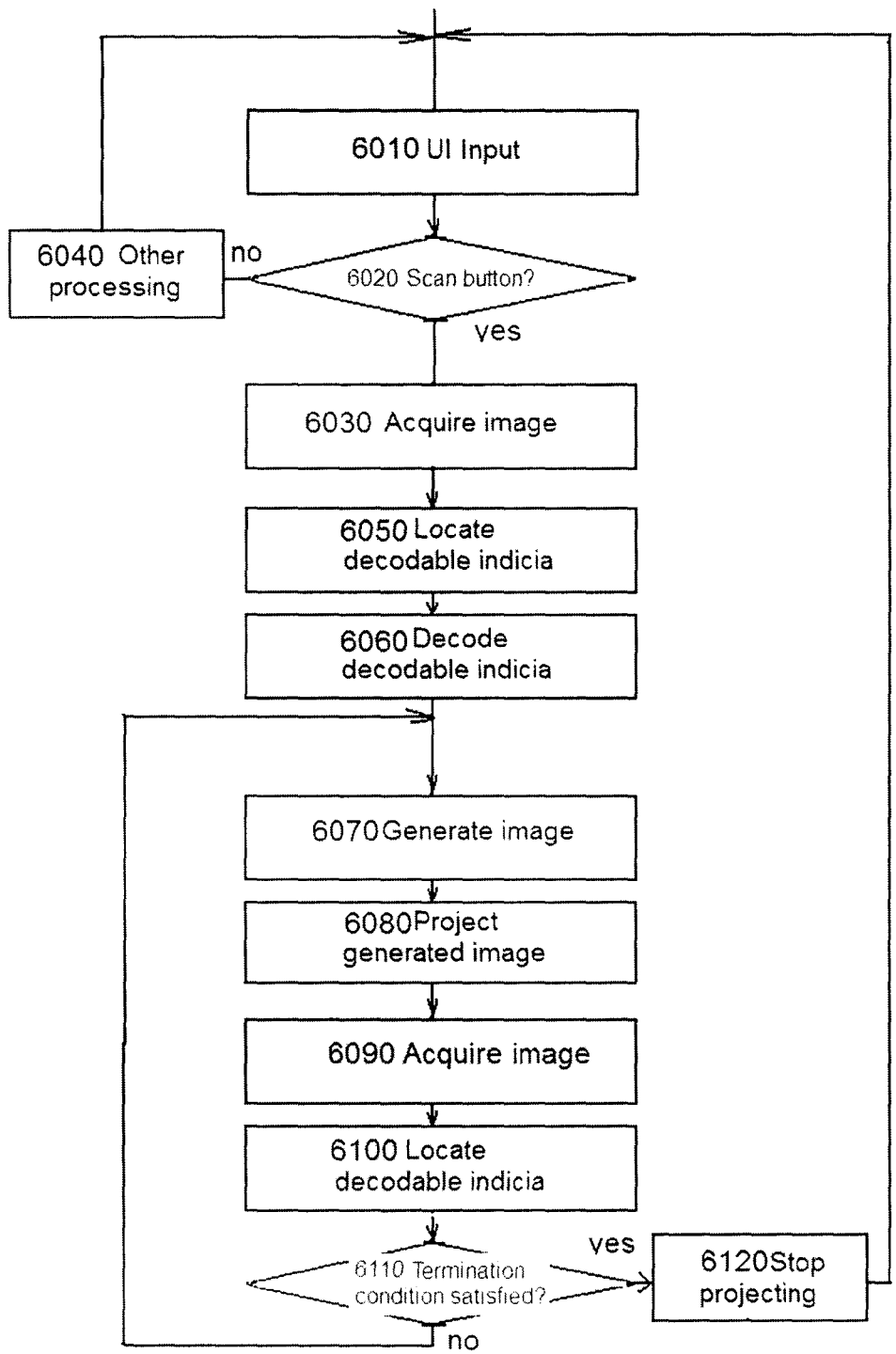
FIGS. 5a and 5b depict flowcharts of illustrative embodiments of a method of projecting an image by a decodable indicia reading terminal disclosed herein.

An illustrative embodiment of a method of projecting an image by a decodable indicia reading terminal disclosed herein is now being described with references to the flowchart of FIG. 5a.

At steps 6010-6020, EIR terminal 100 can perform a user interface input loop, and responsive to establishing at step 6020 that Scan button has been activated by the operator of terminal 100, the processing can continue at step 6030; otherwise, the method can loop back to step 6010. A skilled artisan would appreciate the fact that other ways of initiating an image acquiring operation are within the scope of this disclosure.

At step 6030, EIR terminal 100 can acquire an image of the object focused onto by the imaging lens.

At step 6050, EIR terminal 100 can locate one or more decodable indicia within the acquired image.

At step 6060, EIR terminal 100 can decode one or more decodable indicia within the acquired image.

At step 6070, EIR terminal 100 can generate an image to be projected onto the surface of the target object, as described in details herein supra.

At step 6080, EIR terminal 100 can project the generated image onto the surface of the target object, as described in details herein supra.

At step 6090, EIR terminal 100 can acquire an image of the object focused onto by the imaging lens.

At step 6100, EIR terminal 100 can locate one or more decodable indicia within the acquired image.

Responsive to ascertaining at step 6110 that the condition of termination has been satisfied, EIR terminal can continue processing at step 6120; otherwise, the method can loop back to step 6070. As noted herein supra, the condition of termination can be provided, e.g., by a pre-defined timeout expiration or a user interface action.

At step 6120, EIR terminal 100 can stop projecting the generated image, and the method can loop back to step 6010.

In another embodiment, the EIR terminal can be configured to determine the change of its spatial position relatively to its spatial position at the time of acquiring an image of the target object, and to compensate for the terminal movements when projecting the image onto the surface of the target object, so that the projection of the image remained stationary despite possible movements of the terminal (e.g., due to hand tremor of the terminal operator) as long as the decoded indicia remains within the FOV of the imaging device.

Responsive to acquiring an image of the target object, the EIR terminal can set a point of origin at its current spatial position, and to start tracking, using motion sensing data returned by the motion sensing device, any subsequent movements of the terminal relatively to the point of origin. At a pre-defined rate (e.g., 25 times per second), the EIR terminal can determine the change in its position relatively to the point of origin, and to adjust the positions of the image forming elements (e.g., rotatable mirrors 90 and 94 via drivers 92 and 96, respectively) accordingly, so that the projection of the image onto the surface of the target object remained stationary. Terminal 100 can stop projecting the image responsive to detecting a change in its spatial position and/or orientation leading to the new FOV of the imaging device no longer included the decodable indicia used to produce the projected image. Alternatively, EIR terminal 100 can stop projecting the image responsive to receiving a user interface action to acquire a new image.

Figure 5B:
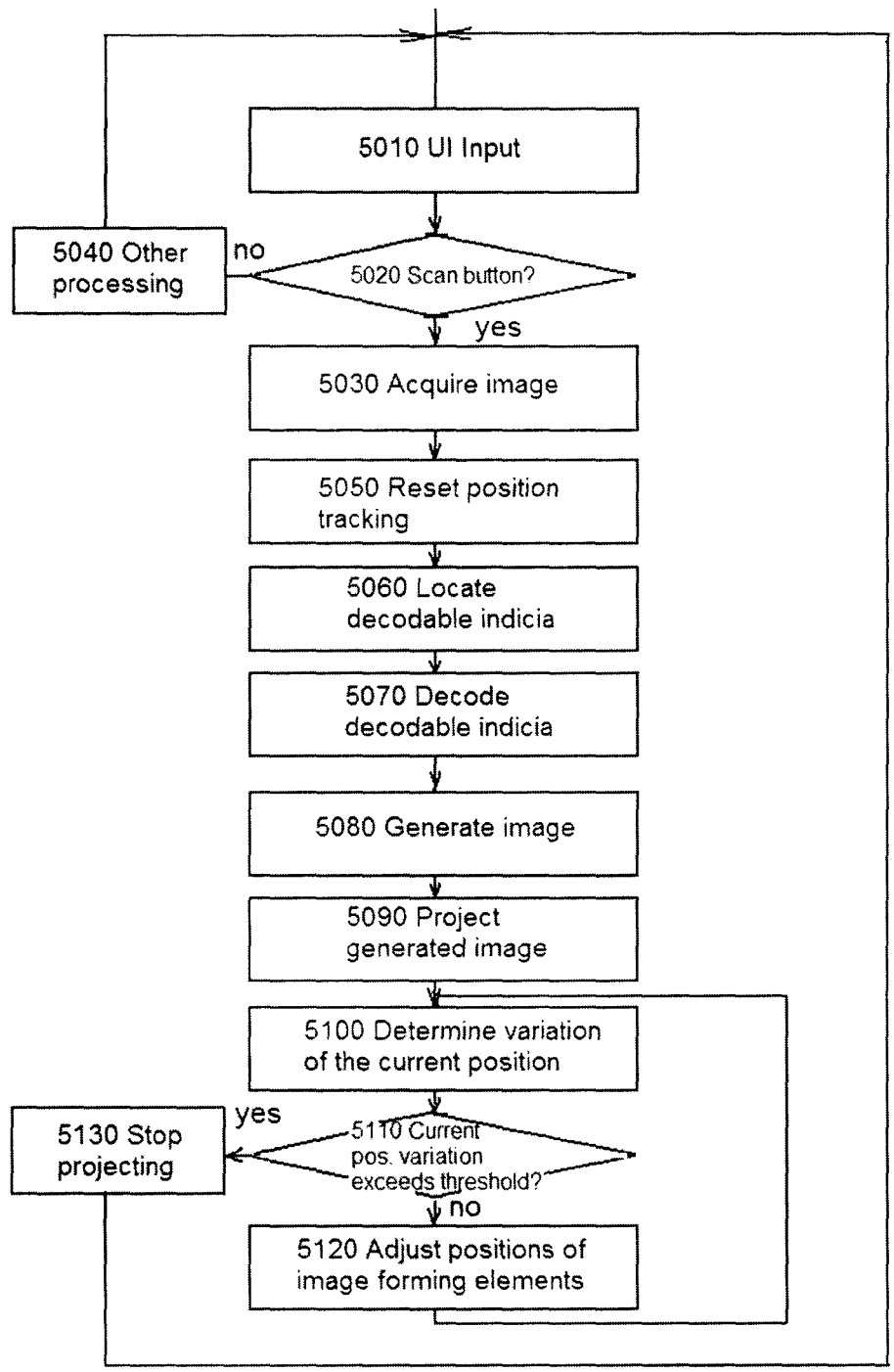

An illustrative embodiment of a method of projecting an image by a decodable indicia reading terminal disclosed herein is now being described with references to the flowchart of FIG. 5b.

At steps 5010-5020, EIR terminal 100 can perform a user interface input loop, and responsive to establishing at step 5020 that Scan button has been activated by the operator of terminal 100, the processing can continue at step 5030; otherwise, the method can loop back to step 5010. A skilled artisan would appreciate the fact that other ways of initiating an image acquiring operation are within the scope of this disclosure.

At step 5030, EIR terminal 100 can acquire an image of the object focused onto by the imaging lens.

At step 5050, EIR terminal 100 can reset the position tracking variables thus setting a point of origin at its current spatial position, for subsequent tracking of the terminal movements.

At step 5060, EIR terminal 100 can locate one or more decodable indicia within the acquired image.

At step 5070, EIR terminal 100 can decode one or more decodable indicia within the acquired image.

At step 5080, EIR terminal 100 can generate an image to be projected onto the surface of the target object, as described in details herein supra.

At step 5090, EIR terminal 100 can project the generated image onto the surface of the target object, as described in details herein supra.

At step 5100, EIR terminal 100 can determine the variation of its current position relatively to the point of origin established at step 5050. In one embodiment, EIR terminal 100 can determine its displacements from the point of origin along at least three perpendicular axes using the motion sensing data returned by the motion sensing device.

Responsive to ascertaining at step 5110 that variation of the position of terminal 100 along any of the coordinate axes does not exceed a pre-defined threshold, EIR terminal 100 can, at step 5120, adjust the positions of the image forming elements (e.g., rotatable mirrors 90 and 94 via drivers 92 and 96, respectively) accordingly. Upon completing step 5120, the method can loop back to step 5100.

Responsive to ascertaining at step 5110 that variation of the position of terminal 100 along at least one coordinate axis exceeds a pre-defined threshold, EIR terminal 100 can, at step 5130, stop projecting the image onto the surface of target object, and the method can loop back to step 5010.

Figure 6:
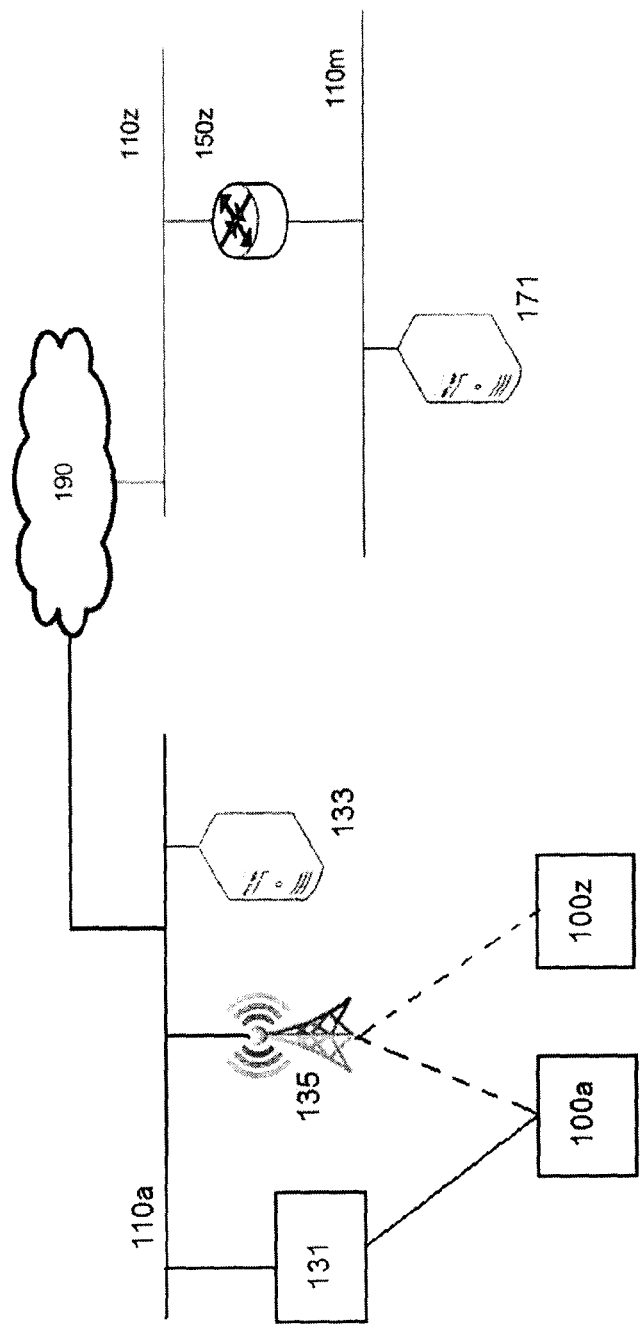
FIG. 6 depicts a network-level layout of a data collection system utilizing decodable indicia reading terminal disclosed herein.

In a further aspect, EIR terminal 100 can be incorporated in a data collection system. The data collection system, schematically shown in FIG. 6, can include a plurality of EIR terminals 100a-100z in communication with a plurality of interconnected networks 110a-110z. In one aspect, the plurality of networks 110a-110z can include at least one wireless communication network. In a further aspect, an EIR terminal can comprise a communication interface which can be used by the terminal to connect to one or more networks 110a-110z. In one embodiment, the communication interface can be provided by a wireless communication interface.

EIR terminal 100 can establish a communication session with an external computer 171. In one embodiment, network frames can be exchanged by optical indicia reading 100 and external computer 171 via one or more routers, base stations, and other infrastructure elements. In another embodiment, external computer 171 can be reachable by EIR terminal 100 via a local area network (LAN). In a yet another embodiment, external computer 171 can be reachable by EIR terminal 100 via a wide area network (WAN). A skilled artisan would appreciate the fact that other methods of providing interconnectivity between optical indicia reading 100 and external computer 171 relying upon LANs, WANs, virtual private networks (VPNs), and/or other types of network are within the scope of this disclosure.

In one embodiment, the communications between EIR terminal 100 and external computer 171 can comprise a series of HTTP requests and responses transmitted over one or more TCP connections. A skilled artisan would appreciate the fact that using other transport and application level protocols is within the scope and the spirit of the invention.

In one embodiment, at least one of the messages transmitted by EIR terminal 100 can include decoded message corresponding to, e.g., a bar code attached to a retail item. For example, EIR terminal 100 can transmit a request to external computer 171 to retrieve product information corresponding to a product identifier encoded by the bar code attached to the retail item. The product information can be used to produce an image to be projected onto the surface of the bar code bearing item, as described in details herein supra.

While the present invention has been particularly shown and described with reference to certain exemplary embodiments, it will be understood by one skilled in the art that various changes in detail can be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

A small sample of systems methods and apparatus that are described herein is as follows:

A1. An encoded information reading (EIR) terminal comprising:
 a microprocessor;
 a memory;
 an EIR device including a two-dimensional imager, said EIR device configured to perform one of: outputting raw message data containing an encoded message, outputting a decoded message corresponding to an encoded message;
 a micro-projector including a light source and a light manipulation sub-system;
 wherein said EIR terminal is configured to acquire an image of a target object in a field of view (FOV) of said two-dimensional imager;
 wherein said EIR terminal is further configured, responsive to successfully locating decodable indicia within said image, to produce a decoded message by decoding said decodable indicia;
 wherein said EIR terminal is further configured, responsive to successfully decoding said decodable indicia, to repeatedly perform the following steps: (i) generating a projectable image; (ii) projecting said projectable image onto a surface of said target object using said micro-projector, so that said projectable image provides a visual reference to said decodable indicia on said surface of said target object; (iii) acquiring an image of an object in said FOV; (iv) locating said decodable indicia within said acquired image; and (v) looping back to step (i) unless a pre-defined condition of termination is satisfied.

A2. The EIR terminal of (A1), wherein a frequency of performing said steps (i)-(v) can be calculated to compensate for movements of said EIR terminal.

A3. The EIR terminal of (A1), wherein said pre-defined condition of termination is provided by one of: an expiration of a pre-defined timeout and a user interface action.

A4. The EIR terminal of (A1), wherein said EIR terminal is configured to acquire said image of said target object responsive to a user interface action.

A5. The EIR terminal of (A1), said visual reference is provided by at least one of: overlaying each of said projectable images over said decodable indicia on said surface of said target object, disposing each of said projectable images on said surface of said target object within a distance from said decodable indicia not exceeding a characteristic dimension of said decodable indicia.

A6. The EIR terminal of (A1), wherein each of said projectable images includes at least one of: a text string comprising at least a part of said decoded message, a text string derived from said decoded message.

A7. The EIR terminal of (A1), further comprising a second EIR device selected from the group consisting of: a radio-frequency identifier (RFID) reading device and a card reading device, said EIR device configured to perform one of: outputting raw message data containing an encoded message, outputting a decoded message corresponding to an encoded message.

B1. An EIR terminal comprising:
 a microprocessor;
 a memory;
 an EIR device including a two-dimensional imager, said EIR device configured to perform one of: outputting raw message data containing an encoded message, outputting a decoded message corresponding to an encoded message;
 a micro-projector including a light source and a light manipulation sub-system;
 a motion sensing device configured to output motion sensing data;
 wherein said EIR terminal is configured to acquire an image of a target object in a field of view (FOV) of said two-dimensional imager;
 wherein said EIR terminal is further configured, responsive to successfully locating decodable indicia within said image, to produce a decoded message by decoding said decodable indicia;
 wherein said EIR terminal is further configured, responsive to successfully decoding said decodable indicia, to generate a projectable image and project said projectable image onto a surface of said target object using said micro-projector, said projectable image providing a visual reference to said decodable indicia on said surface said target object; and
 wherein said EIR terminal is further configured, using said motion sensing data, to compensate for terminal movements when projecting said projectable image.

B2. The EIR terminal of (B1), wherein said motion sensing device is provided by at least three accelerometers configured to measure proper acceleration values of said EIR terminal in at least three mutually-perpendicular directions.

B3. The EIR terminal of (B1), wherein said EIR terminal is configured to acquire said image of said target object responsive to a user interface action.

B4. The EIR terminal of (B1), wherein said visual reference is provided by at least one of: overlaying said projectable image over said decodable indicia on said surface of said target object, disposing said projectable image on said surface of said target object within a distance from said decodable indicia not exceeding a characteristic dimension of said decodable indicia.

B5. The EIR terminal of (B1), wherein said projectable image includes at least one of: a text string comprising at least a part of said decoded message, a text string derived from said decoded message.

B6. The EIR terminal of (B1), further comprising a second EIR device selected from the group consisting of: a radio-frequency identifier (RFID) reading device and a card reading device, said EIR device configured to perform one of: outputting raw message data containing an encoded message, outputting a decoded message corresponding to an encoded message.

C1. An EIR terminal comprising:
 a microprocessor;
 a memory;
 an EIR device including a two-dimensional imager, said EIR device configured to perform one of: outputting raw message data containing an encoded message, outputting a decoded message corresponding to an encoded message;
 a micro-projector including a light source and a light manipulation sub-system;

a motion sensing device configured to output motion sensing data;

wherein said EIR terminal is configured to acquire an image of a target object in a field of view (FOV) of said two-dimensional imager;

wherein said EIR terminal is further configured, responsive to successfully locating decodable indicia within said image, to produce a decoded message by decoding decodable indicia of said decodable indicia; and wherein said EIR terminal is further configured, responsive to successfully decoding said decodable indicia, to generate a projectable image and project said projectable image onto a surface said target object using said micro-projector, said projectable image including at least one of: a text string comprising at least part of said decoded message, a text string derived from said decoded message; and wherein said EIR terminal is further configured, using said motion sensing data, to compensate for terminal movements when projecting said projectable image.

C2. The EIR terminal of (C1), wherein said motion sensing device is provided by at least three accelerometers configured to measure proper acceleration values of said EIR terminal in at least three mutually-perpendicular directions.

C3. The EIR terminal of (C1), wherein said EIR terminal is configured to acquire said image of said target object responsive to receiving a user interface action.

C4. The EIR terminal of (C1), wherein said projectable image provides a visual reference to said decodable indicia on said surface of said target object.

C5. The EIR terminal of (C1), wherein said visual reference is provided by at least one of: overlaying said projectable image over said decodable indicia, disposing said projectable image within a distance from said decodable indicia not exceeding a characteristic dimension of said decodable indicia.

C6. The EIR terminal of (C1), wherein said micro-projector is configured to project onto said surface of said target object a border of said FOV of said two-dimensional imager.

C7. The EIR terminal of (C1), further comprising a second encoded information reading (EIR) device selected from the group consisting of: a radio-frequency identifier (RFID) reading device and a card reading device, said EIR device configured to perform one of: outputting raw message data containing an encoded message, outputting a decoded message corresponding to an encoded message.

The invention claimed is:

1. An encoded information reading (EIR) terminal comprising:
   a microprocessor;
   a memory;
   an EIR device including a two-dimensional imager, said EIR device configured to perform one of: outputting raw message data containing an encoded message, outputting a decoded message corresponding to an encoded message;
   a micro-projector including a light source and a light manipulation sub-system;
   wherein said EIR terminal is configured to acquire an image of a target object in a field of view (FOV) of said two-dimensional imager;
   wherein said EIR terminal is further configured, responsive to successfully locating decodable indicia within said image, to produce a decoded message by decoding said decodable indicia;
   wherein said EIR terminal is further configured, responsive to successfully decoding said decodable indicia, to repeatedly perform the following steps: (i) generating a projectable image; (ii) projecting said projectable image onto a surface of said target object using said micro-projector, so that said projectable image provides a visual reference to said decodable indicia on said surface of said target object; (iii) acquiring an image of an object in said FOV; (iv) locating said decodable indicia within said acquired image; and (v) looping back to step (i) unless a pre-defined condition of termination is satisfied.

2. The EIR terminal of claim 1, wherein a frequency of performing said steps (i)-(v) is calculated to compensate for movements of said EIR terminal.

3. The EIR terminal of claim 1, wherein said pre-defined condition of termination is provided by one of: an expiration of a pre-defined timeout and a user interface action.

4. The EIR terminal of claim 1, wherein said EIR terminal is configured to acquire said image of said target object responsive to a user interface action.

5. The EIR terminal of claim 1, said visual reference is provided by at least one of: overlaying each of said projectable images over said decodable indicia on said surface of said target object, disposing each of said projectable images on said surface of said target object within a distance from said decodable indicia not exceeding a characteristic dimension of said decodable indicia.

6. The EIR terminal of claim 1, wherein each of said projectable images includes at least one of: a text string comprising at least a part of said decoded message, a text string derived from said decoded message.

7. The EIR terminal of claim 1, further comprising a second EIR device selected from the group consisting of: a radio-frequency identifier (RFID) reading device and a card reading device, said EIR device configured to perform one of: outputting raw message data containing an encoded message, outputting a decoded message corresponding to an encoded message.

8. An EIR terminal comprising:
   a microprocessor;
   a memory;
   an EIR device including a two-dimensional imager, said EIR device configured to perform one of: outputting raw message data containing an encoded message, outputting a decoded message corresponding to an encoded message;
   a micro-projector including a light source and a light manipulation sub-system;
   a motion sensing device configured to output motion sensing data;
   wherein said EIR terminal is configured to acquire an image of a target object in a field of view (FOV) of said two-dimensional imager;
   wherein said EIR terminal is further configured, responsive to successfully locating decodable indicia within said image, to produce a decoded message by decoding said decodable indicia;
   wherein said EIR terminal is further configured, responsive to successfully decoding said decodable indicia, to generate a projectable image and project said projectable image onto a surface of said target object using said micro-projector, said projectable image providing a visual reference to said decodable indicia on said surface said target object; and
   wherein said EIR terminal is further configured, using said motion sensing data, to compensate for terminal movements when projecting said projectable image.

9. The EIR terminal of claim 8, wherein said motion sensing device is provided by at least three accelerometers configured to measure proper acceleration values of said EIR terminal in at least three mutually-perpendicular directions.

10. The EIR terminal of claim 8, wherein said EIR terminal is configured to acquire said image of said target object responsive to a user interface action.

11. The EIR terminal of claim 8, wherein said visual reference is provided by at least one of: overlaying said projectable image over said decodable indicia on said surface of said target object, disposing said projectable image on said surface of said target object within a distance from said decodable indicia not exceeding a characteristic dimension of said decodable indicia.

12. The EIR terminal of claim 8, wherein said projectable image includes at least one of: a text string comprising at least a part of said decoded message, a text string derived from said decoded message.

13. The EIR terminal of claim 8, further comprising a second EIR device selected from the group consisting of: a radio-frequency identifier (RFID) reading device and a card reading device, said EIR device configured to perform one of: outputting raw message data containing an encoded message, outputting a decoded message corresponding to an encoded message.

14. An EIR terminal comprising:
a microprocessor;
a memory;
an EIR device including a two-dimensional imager, said EIR device configured to perform one of: outputting raw message data containing an encoded message, outputting a decoded message corresponding to an encoded message;
a micro-projector including a light source and a light manipulation sub-system;
a motion sensing device configured to output motion sensing data;
wherein said EIR terminal is configured to acquire an image of a target object in a field of view (FOV) of said two-dimensional imager;
wherein said EIR terminal is further configured, responsive to successfully locating decodable indicia within said image, to produce a decoded message by decoding decodable indicia of said decodable indicia; and
wherein said EIR terminal is further configured, responsive to successfully decoding said decodable indicia, to generate a projectable image and project said projectable image onto a surface said target object using said micro-projector, said projectable image including at least one of: a text string comprising at least part of said decoded message, a text string derived from said decoded message; and
wherein said EIR terminal is further configured, using said motion sensing data, to compensate for terminal movements when projecting said projectable image.

15. The EIR terminal of claim 14, wherein said motion sensing device is provided by at least three accelerometers configured to measure proper acceleration values of said EIR terminal in at least three mutually-perpendicular directions.

16. The EIR terminal of claim 14, wherein said EIR terminal is configured to acquire said image of said target object responsive to receiving a user interface action.

17. The EIR terminal of claim 14, wherein said projectable image provides a visual reference to said decodable indicia on said surface of said target object.

18. The EIR terminal of claim 17, wherein said visual reference is provided by at least one of: overlaying said projectable image over said decodable indicia, disposing said projectable image within a distance from said decodable indicia not exceeding a characteristic dimension of said decodable indicia.

19. The EIR terminal of claim 14, wherein said micro-projector is configured to project onto said surface of said target object a border of said FOV of said two-dimensional imager.

20. The EIR terminal of claim 14, further comprising a second encoded information reading (EIR) device selected from the group consisting of: a radio-frequency identifier (RFID) reading device and a card reading device, said EIR device configured to perform one of: outputting raw message data containing an encoded message, outputting a decoded message corresponding to an encoded message.

* * * * *